US008511371B2

(12) United States Patent
Onda et al.

(10) Patent No.: US 8,511,371 B2
(45) Date of Patent: Aug. 20, 2013

(54) AIR CONDITIONER FOR AUTOMOBILE

(75) Inventors: Masaharu Onda, Saitama (JP); Ryuji Tsukuda, Saitama (JP); Hiromichi Yanashima, Saitama (JP)

(73) Assignee: Calsonic Kansei Corporation, Saitama (JP)

( * ) Notice: Subject to any disclaimer, the term of this patent is extended or adjusted under 35 U.S.C. 154(b) by 0 days.

(21) Appl. No.: 12/310,229

(22) PCT Filed: Aug. 17, 2007

(86) PCT No.: PCT/JP2007/066031
§ 371 (c)(1),
(2), (4) Date: Feb. 18, 2009

(87) PCT Pub. No.: WO2008/023641
PCT Pub. Date: Feb. 28, 2008

(65) Prior Publication Data
US 2009/0242167 A1  Oct. 1, 2009

(30) Foreign Application Priority Data

Aug. 22, 2006  (JP) .................................. 2006-225291
Jun. 28, 2007  (JP) .................................. 2007-170352

(51) Int. Cl.
*B60H 1/00*   (2006.01)
(52) U.S. Cl.
USPC ............... 165/202; 165/204; 165/42; 165/43; 454/121; 454/126; 454/156; 454/160; 454/161; 237/12.3 A; 237/12.3 B
(58) Field of Classification Search
USPC ...................... 165/202, 204, 42, 43; 454/121, 454/126, 156, 160, 161; 237/12.3 A, 12.3 B
See application file for complete search history.

(56) References Cited

U.S. PATENT DOCUMENTS 6,019,288 A *  2/2000  Arold et al. ................... 165/204
6,319,112 B2  11/2001  Komowski
(Continued)

FOREIGN PATENT DOCUMENTS

DE   199 16 992   11/1999
JP    4-38814     2/1992
(Continued)

OTHER PUBLICATIONS

Supplementary European Search Report issued Aug. 19, 2010 in European Application No. 07 79 2647 corresponding to the present U.S. application.

(Continued)

*Primary Examiner* — John Ford
(74) *Attorney, Agent, or Firm* — Wenderoth, Lind & Ponack, L.L.P.

(57) ABSTRACT

An air conditioner for an automobile includes a foot door (11) and a mixing area. The foot door has a partition wall, and is movable at least between an advanced position where the partition wall reaches a state of blocking an air flow from a merging area to the downstream side in an air passage, and a retreated position where the partition wall retreats from the advanced position in the air passage. The mixing area is provided in the air passage while the partition wall is located in the advanced position, and is designed to cause the air flowing from a cold air passage and the air flowing from a hot air passage into the merging area to mix up more by using the partition wall to block the air flowing from the merging area to the downstream side. Thus, the air conditioner is designed to cause the air to flow into the discharge passage systems via the mixing area.

10 Claims, 12 Drawing Sheets

(56) References Cited

U.S. PATENT DOCUMENTS

| | | | |
|---|---|---|---|
| 6,852,024 B2* | 2/2005 | Seki | 454/121 |
| 6,913,529 B2* | 7/2005 | Seki | 454/121 |
| 7,806,172 B2* | 10/2010 | Seki et al. | 165/202 |
| 7,857,041 B2* | 12/2010 | Fukagawa et al. | 165/202 |
| 2001/0012756 A1 | 8/2001 | Komowski | |
| 2004/0112075 A1 | 6/2004 | Kachi | |
| 2004/0152410 A1 | 8/2004 | Seki | |
| 2006/0030255 A1* | 2/2006 | Seki | 454/121 |
| 2006/0060342 A1* | 3/2006 | Yamamoto | 165/202 |
| 2007/0181295 A1* | 8/2007 | Masatsugu | 165/202 |
| 2009/0242167 A1* | 10/2009 | Onda et al. | 165/61 |

FOREIGN PATENT DOCUMENTS

| | | |
|---|---|---|
| JP | 10-81122 | 3/1998 |
| JP | 2005170302 A * | 6/2005 |
| JP | 2005-271772 | 10/2005 |
| JP | 2005271772 A * | 10/2005 |
| JP | 2008-18875 | 1/2008 |

OTHER PUBLICATIONS

Chinese Office Action, with English translation, issued May 25, 2011 in corresponding Chinese Patent Application No. 200780031102.8.

Response to Chinese Office Action, with English translation, dated Aug. 9, 2011 in corresponding Chinese Patent Application No. 200780031102.8.

* cited by examiner

AIR CONDITIONER FOR AUTOMOBILE

BACKGROUND OF THE INVENTION (1) Field of the Invention

The present invention relates to an air conditioner for an automobile.

(2) Description of Related Art

There has been known a conventional air conditioner for an automobile configured such that: an air passage is formed inside a case, the air passage including a cold air passage extending via an evaporator, a hot air passage extending via a heater core, and multiple discharge passage systems communicating with outlets (a defroster outlet, a vent outlet, and a foot outlet); and the air flows to the discharge passages via a merging area where the cold air passage and the hot air passage merge together (see Patent Document 1, for example).

In this air conditioner disclosed in Patent Document 1, a foot door is provided on a downstream side of the merging area, and the air can be distributed to two outlets, that is, the foot outlet and any one of the defroster outlet and the vent outlet, by opening this foot door almost by half.

Patent Document 1: JP-A-2001-113931

BRIEF SUMMARY OF THE INVENTION

Problem to be Solved by the Invention

The scheme of distributing the air between the multiple discharge passages by opening the foot door by half on the basis of the prior art does not sufficiently mix the air from the cold air passage and the air from the hot air passage together. As a result, a cooler air flows into one discharge passage (for example, a discharge passage communicating with the defroster outlet or the vent outlet), whereas a warmer air flows into the other discharge passage (for example, a discharge passage communicating with the foot outlet). This makes the air temperature different between the outlets, and accordingly makes it impossible to control the air conditions as desired.

The present invention has been made in view of the above problem. An object of the present invention is to provide an air conditioner for an automobile which is capable of reducing the difference in air temperature among outlets by causing the air from a cold air passage and the air from a hot air passage to mix up more inside a case.

Means for Solving the Problem

In order to attain the above object, an air conditioner for an automobile according to an embodiment of the present invention has a case, and is configured such that: an air passage including a cold air passage, a hot air passage, and multiple discharge passage systems is formed inside the case, the cold air passage extending via an evaporator, the hot air passage extending via a heater core, and the discharge passage systems respectively communicating with outlets; and the air flows into the discharge passage systems via a merging area into which the cold air passage and the hot air passage merge. This air conditioner for an automobile has a door and a mixing area. The door has a partition wall, and is movable at least between an advanced position where the partition wall reaches a state of blocking the air flowing from the merging area to the downstream side in the air passage; and a retreated position where the partition wall retreats from the advanced position. The mixing area is provided in the air passage while the partition wall is located in the advanced position, and is designed to cause the air flowing from the cold air passage and the air flowing from the hot air passage into the merging area to mix up more by using the partition wall to block the air flowing from the merging area to the downstream side. Thus, the air conditioner for an automobile for the present invention is designed to cause the air to flow into the discharge passage systems via the mixing area.

Effect of the Invention

In the air conditioner for an automobile according to the present invention, a cold air having come from the cold air passage via the evaporator and a hot air having come from the hot air passage via the heater core become confluent in the merging area in the air passage inside the case. Then, the confluent air is controlled in temperature to flow via the merging area into the discharge passage systems. Thus, the air is blown into the inside of the vehicle compartment from the outlets communicating with the respective discharge passage systems. While this air is flowing in the air passage, if the door is located in the advanced position, the partition wall of the door blocks the air flow from the merging area to the downstream side. This block makes it possible to facilitate the mixture of the air (cold air) flowing into the merging area from the cold air passage and the air (hot air) flowing from the hot air passage. In this manner, the partition wall of the door located in the advanced position forms the merging area, and the merging area thus formed facilitates the mixture of the cold air and the hot air. This facilitation reduces the difference in temperature of the air flowing into the discharge passage systems via the merging area. Consequently, it is possible to reduce the difference in air temperature among the outlets communicating with the respective outlets.

Figure 1:
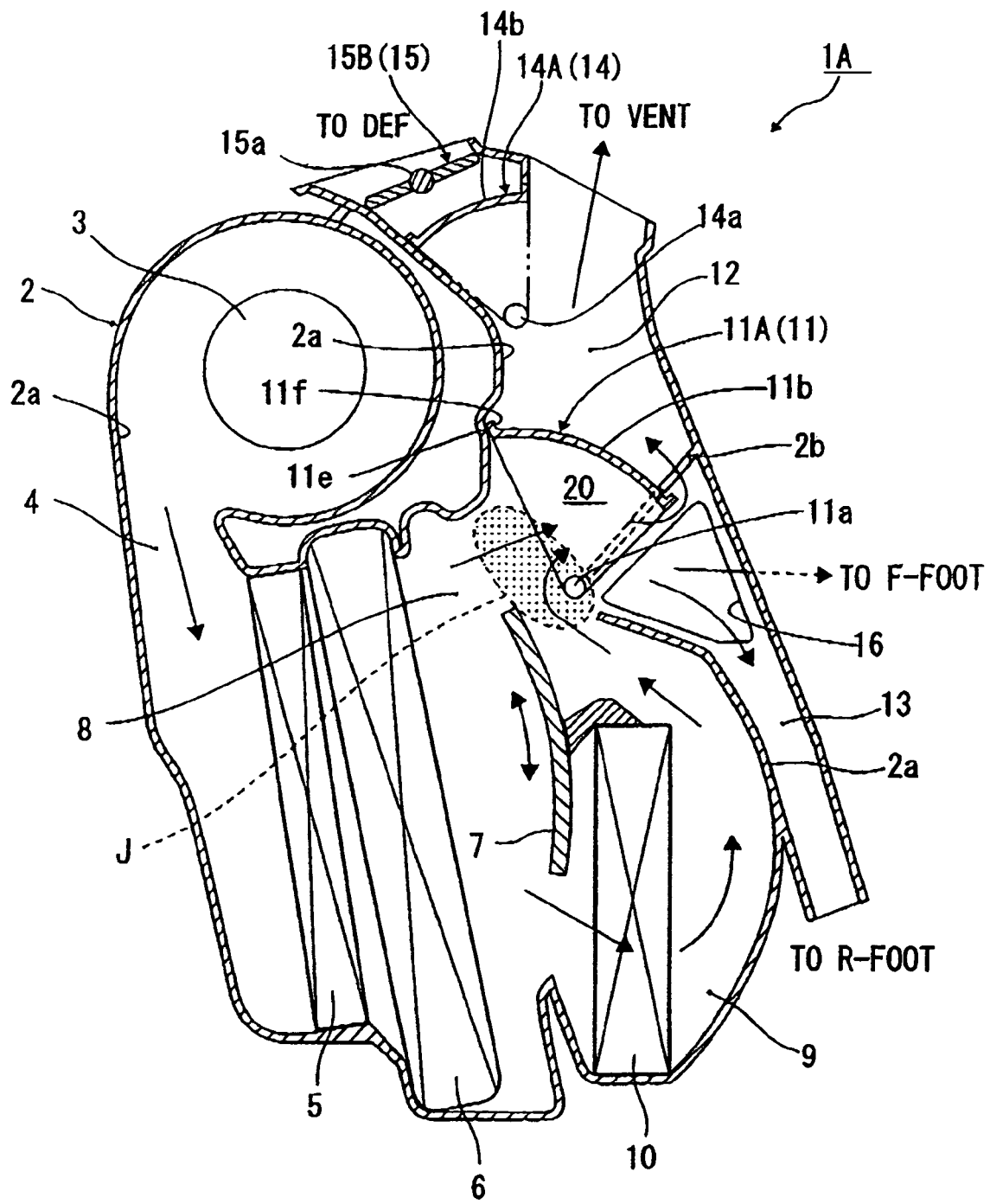
FIG. 1 is a vertical cross-sectional side view showing a bi-level mode for blowing the air from both a vent outlet and a foot outlet in an air conditioner for an automobile according to Embodiment 1.

EXPLANATION OF REFERENCE NUMERALS 1A, 1B air conditioner for automobile
2, 22 case
6, 26 evaporator
8, 28 cold air passage
9, 29 hot air passage
10, 30 heater core
11, 31 foot door
11A, 31A advanced position
11B, 31B retreated position
11b, 31b partition wall
12, 13, 32, 33 discharge passage
DEF defroster outlet
VENT vent outlet
C-VENT center vent outlet
S-VENT side vent outlet
F-FOOT front-side foot outlet
R-FOOT rear-side foot outlet
J merging area
20, 40 mixing area

DETAILED DESCRIPTION OF THE INVENTION

Descriptions will be provided hereinbelow of exemplary embodiments of an air conditioner for an automobile according to the present invention on the basis of Embodiments 1 and 2 shown in the drawings.

Embodiment 1

Figure 2:
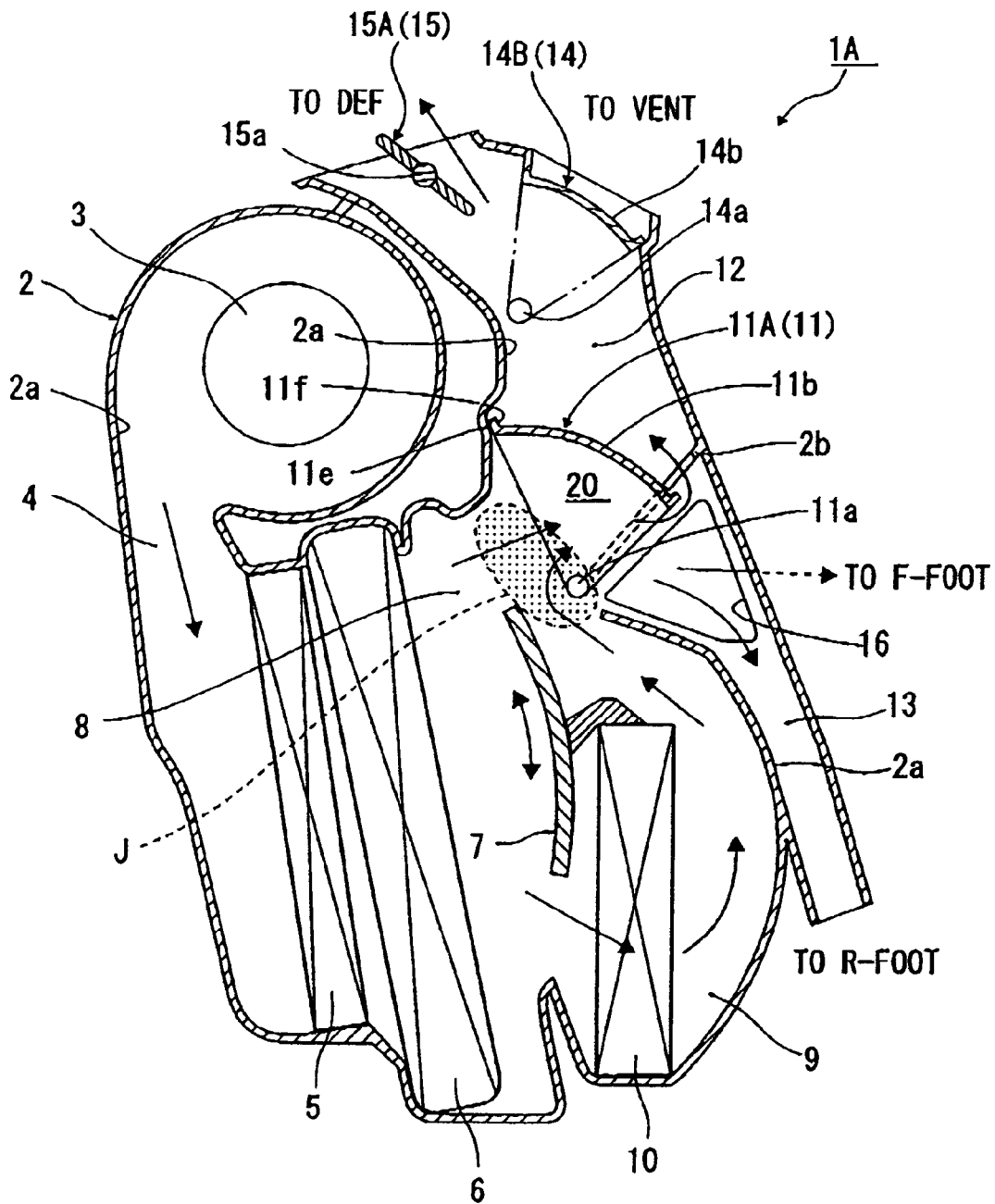
FIG. 2 is a vertical cross-sectional side view showing a defrost-foot mode for blowing the air from both a defroster outlet and the foot outlet in the air conditioner for an automobile according to Embodiment 1.
Figure 3:
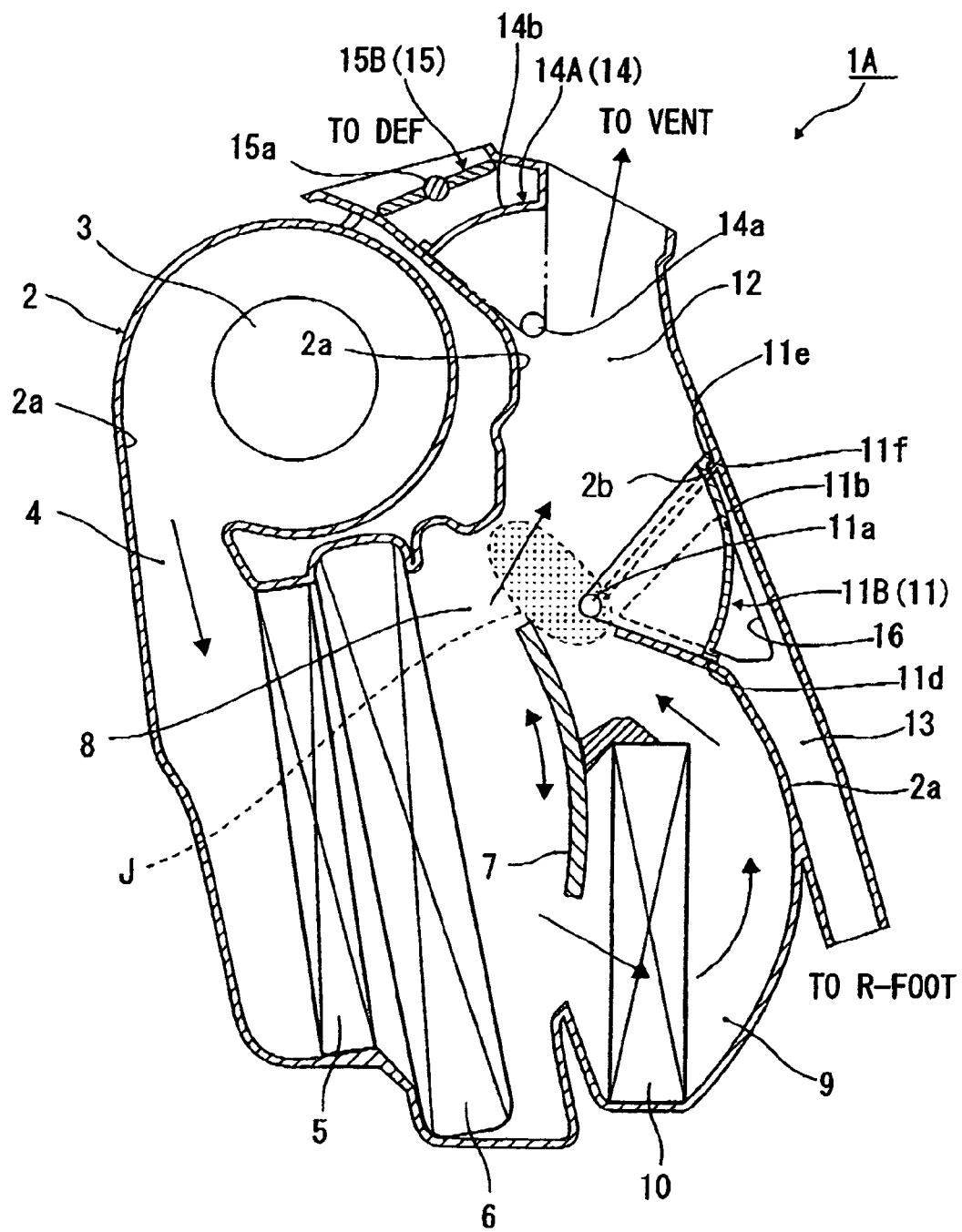
FIG. 3 is a vertical cross-sectional side view showing a vent mode for blowing the air from only the vent outlet in the air conditioner for an automobile according to Embodiment 1.
Figure 4:
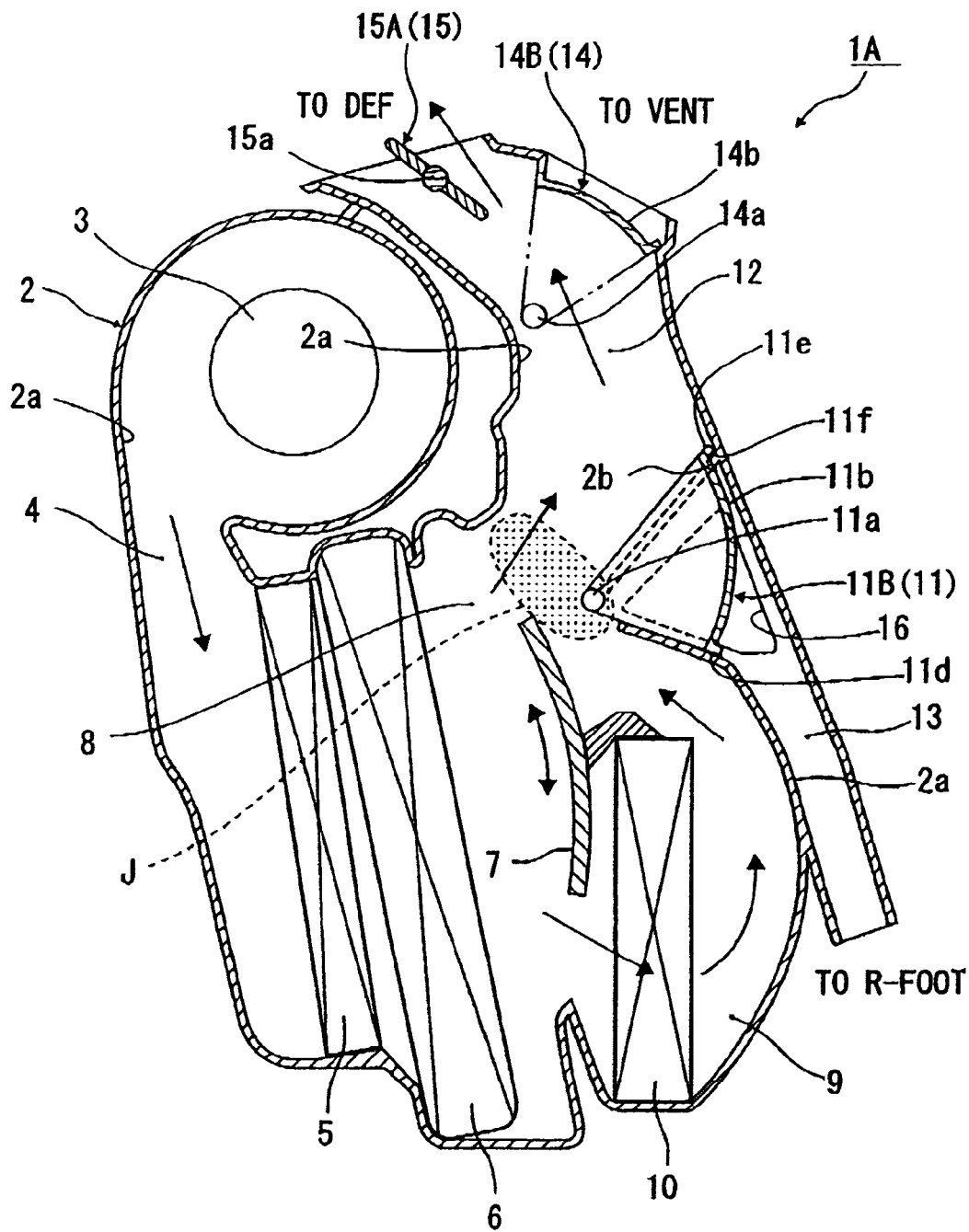
FIG. 4 is a vertical cross-sectional side view showing a defrost mode for blowing the air from only the defroster outlet in the air conditioner for an automobile according to Embodiment 1.
Figure 5:
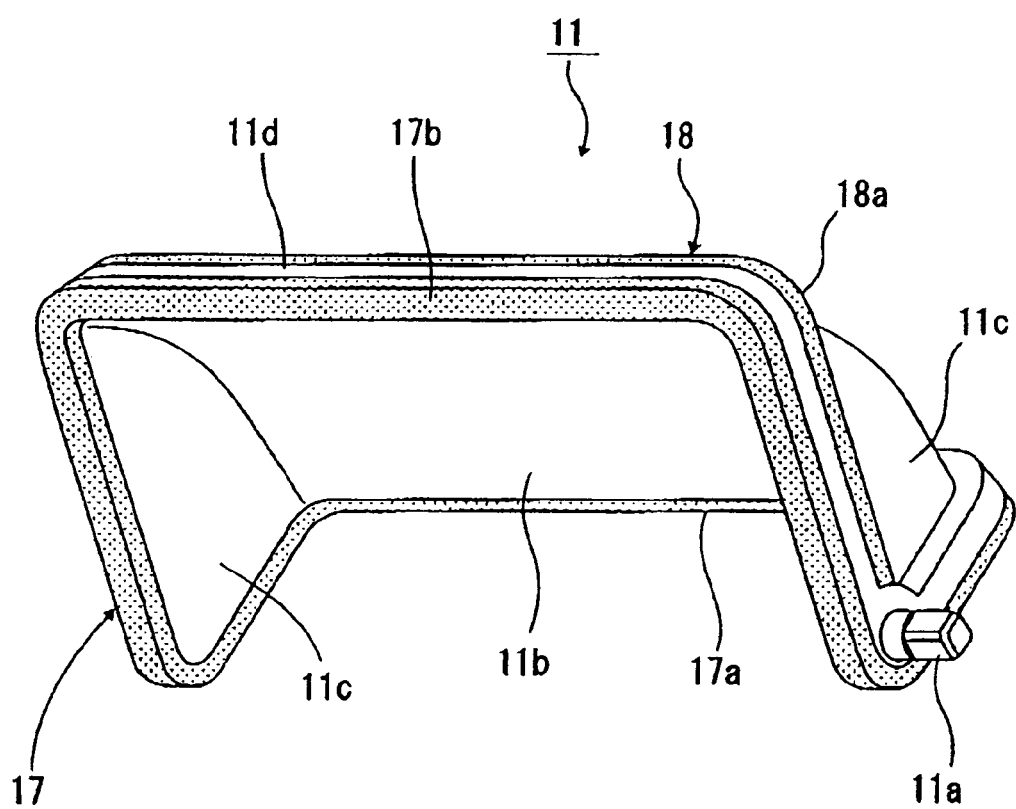
FIG. 5 is a perspective view showing a foot door in the air conditioner for an automobile according to Embodiment 1.

FIG. 1 is a vertical cross-sectional side view showing a bi-level mode for blowing the air out of both a vent outlet and a foot outlet in an air conditioner for an automobile according to Embodiment 1. FIG. 2 is a vertical cross-sectional side view showing a defrost-foot mode for blowing the air from both a defroster outlet and the foot outlet in the air conditioner for an automobile according to Embodiment 1. FIG. 3 is a vertical cross-sectional side view showing a vent mode for blowing the air from only the vent outlet in the air conditioner for an automobile according to Embodiment 1. FIG. 4 is a vertical cross-sectional side view showing a defrost mode for blowing the air from only the defroster outlet in the air conditioner for an automobile according to Embodiment 1. FIG. 5 is a perspective view showing a foot door in the air conditioner for an automobile according to Embodiment 1.

In an air conditioner 1A for an automobile according to Embodiment 1, an air passage is formed by appropriately defining the inside of a case 2 made of a synthetic resin or the like by using an inner wall 2a and the like. Conditions including a purification level and a temperature of the air are controlled by: air blowing parts (a blower 3, an introduction passage 4) provided in their respective upstream locations of the air passage; functional parts (a filter 5, an evaporator 6, a heater core 10 and the like) provided in the middle of the air passage; or a slide door 7. Air outlets (outlet modes) for this controlled air are changeable by an opened or closed position of each of a vent door 14, a defrost door 15 and a foot door 11.

The air discharged from the blower 3 is purified while passing the filter 5 provided in the introduction passage 4. In addition, the evaporator 6 constituting a part of a refrigeration cycle is provided posterior to (downstream of) the filter 5, so that the air can be cooled. A hot air passage 9 with the heater core 10 and a cold air passage 8 without the heater core 10 are provided in parallel posterior to the evaporator 6.

A ratio of distribution of the air between the cold air passage 8 and the hot air passage 9 can be set variable by a position in which the slide door 7 provided posterior to the evaporator 6 is located. Specifically, in the case of Embodiment 1, while the slide door 7 is located in the uppermost position, the air does not flow into the cold air passage 8, but flows in the hot air passage 9 only. While the slide door 7 is located in the lowermost position, the air does not flow into the hot air passage 9, but flows in the cold air passage 8 only. While the slide door 7 is located in a middle position as shown in FIGS. 1 to 4, the ratio between the air flowing in the cold air passage 8 and the air flowing in the hot air passage 9 is determined depending on the position.

While the slide door 7 is located in the middle position as shown in FIGS. 1 to 4, the air having passed the hot air passage 9 and the air having passed the cold air passage 8 are designed to become confluent in a merging area J. After becoming confluent in the merging area J, the air is distributed among discharge passages 12, 13 and a discharge port 16, and is thus blown out from the corresponding outlets (a defroster outlet (DEF), a vent outlet (VENT), and foot outlets (F-FOOT [front], R-FOOT[rear]). The distribution of the air among the discharge passages 12, 13 and the discharge port 16 as well as the selection of the outlets is controlled by the vent door 14, the defrost door 15 and the foot door 11. This control will be described later.

Here, in Embodiment 1, provided is the foot door 11 (door) movable between an advanced position 11A (shown in FIGS. 1 and 2) that blocks the downstream side of the merging area J and a retreated position 11B (shown in FIGS. 3 and 4) that is retreated from the advanced position 11A. In Embodiment 1, this foot door 11 is configured as a rotary door of rotary type which is rotatably pivotally supported by the case 2, and which rotates about stems 11a.

Specifically, as shown in FIG. 5, the foot door 11 includes: a pair of substantially sector-shaped sidewalls 11c, 11c which are in parallel with each other; a partition wall 11b which connects the outer circumferential edges of the respective pair of sidewalls 11c, 11c together, and which is shaped like a curved surface (arc surface) having a certain arch-shaped cross-section; and the pair of stems 11a (one of the stems is not illustrated) which jut out in mutually-opposite directions from locations acting as hinges of the substantially sector-shaped sidewalls 11c, respectively. In addition, a substantially U-shaped flange frame 11d is formed so as to connect side edges of the sidewalls 11c and the partition wall 11b. Seal members 17, 18 are adhered to the flange frame 11d. When the foot door 11 is in the retreated position 11B, surfaces 17a, 18a of the seal members 17, 18 abut on the inner wall 2a and an inner flange part 2b of the case 2, respectively. Thereby, the abutting parts are designed to be securely sealed (see FIGS. 3 and 4). In the advanced position 11A, the surface 17b of this seal member 17 abuts on the inner wall 2a of the case 2. Thereby, the abutting part is designed to be securely sealed (see FIGS. 1 and 2).

Next, descriptions will be provided for how the air conditioner for an automobile operates.

[While the Foot Door is Located in the Advanced Position]

In the air conditioner 1A for an automobile according to Embodiment 1, the partition wall 11b blocks the air flow from the merging area J to the downstream side, while the foot door 11 is located in the advanced position 11A as shown in FIGS. 1 and 2. This block (shutoff) of the air forms a mixing area 20 for facilitating the mixture of the air flowing into the merging area J from the cold air passage 8 and from the hot air passage 9.

Specifically, the flow rate of the air becomes smaller, and the direction of the air flow changes to a larger extent, while the foot door 11 is located in the advanced position 11A than while the foot door 11 is not located in the advanced position 11A (or while the foot door 11 is located in the retreated position 11B). The smaller flow rate of the air and the larger change in the air flow direction cause air flow separation, whirl, turbulence and the like. In addition, the paths to the respective outlets become longer in length while the foot door is located in the advanced position 11A. This facilitates the mixture of the cold air flowing into the merging area J from the cold air passage 8 and the hot air flowing into the merging area J from the hot air passage 9. When the partition wall 11b advances to the advanced position 11A in this manner, detour passages (20→42, 20→43, 20→46) in each of which the air flows along the partition wall 11b in a roundabout way are formed for the downstream side (including the discharge passages 12, 13 and the discharge port 16) of the merging area J.

Furthermore, in Embodiment 1, when the foot door 11 is located in the advanced position 11A, the vertical cross-sectional side form of the partition wall 11b is shaped like the arch (is substantially shaped like the arc) which swells out toward the downstream side (toward the discharge passage 12 in Embodiment 1; or upward in FIGS. 1 and 2). This shape makes it easy for the air flowing along the inner surface of the partition wall 11b to return to the upstream side of the mixing area 20, and accordingly makes it easy to cause rotating flows and whirls. This brings about an effect of facilitating the mixture thereof better. Note that the center of the arch or arc in the cross-section need not coincide with the center (the rotational center) of either stem 11a.

Moreover, in Embodiment 1, the cold air passage 8 is arranged relatively close to the defroster outlet (DEF) or the vent outlet (VENT). With this arrangement, if the advanced position 11A is established in a way that the partition wall 11b is located between the cold air passage 8 and the defroster outlet (DEF), or between the cold air passage 8 and the vent outlet (VENT), it is possible to effectively reduce the amount of cold air flowing directly into the defroster outlet (DEF) or the vent outlet (VENT) from the cold air passage 8 without being mixed with the hot air from the hot air passage 9. Consequently, Embodiment 1 is capable of effectively checking the difference in temperature from becoming larger between the defroster outlet (DEF) or the vent outlet (VENT) and the foot outlets (F-FOOT, R-FOOT).

Embodiment 1 brings about this effect by causing an end edge (or the surface 17b of the seal member 17) of the partition wall 11b of the foot door 11 in the moving direction to abut onto the inner wall 2a of the case 2 as shown in FIGS. 1 and 2, and accordingly blocking the air flow from the mixing area 20 to the downstream side along the inner wall 2a by bypassing. In other words, it is easily understood that Embodiment 1 brings about the highest effect by blocking the air from flowing along the inner wall 2a closer to the defroster outlet (DEF) or the vent outlet (VENT), and thus by causing the air to flow to the discharge passage 13 far from the defroster outlet (DEF) or the vent outlet (VENT) in a roundabout way.

While the bi-level mode shown in FIG. 1 is selected, the vent door 14 supported by the case 2 so as to be rotatable about stems 14a is located in a position 14A that closes the defroster outlet (DEF). For this reason, the air having flowed out to the discharge passage 12 from the mixing area 20 through (by passing in a roundabout way) the outside of the end edge of the partition wall 11b in the moving direction is blown out from the vent outlet (VENT). Simultaneously, the air flows out to the discharge port 16 and the discharge passage 13 from the mixing area 20 as well. Consequently, the air is blown out from the front-side foot outlet (F-FOOT) and the rear-side foot outlet (R-FOOT) as well.

On the other hand, while the defrost-foot mode shown in FIG. 2 is selected, the vent door 14 is located in a position 14B that closes the vent outlet (VENT), and concurrently the defrost door 15 supported by the case 2 so as to be rotatable about stems 15a is in an opened condition 15A. For this reason, the air having flowed out to the discharge passage 12 from the mixing area 20 through (by passing in a roundabout way) the outside of the end edge of the partition wall 11b in the moving direction is blown out from the defrost outlet (DEF). Simultaneously, the air flows out to the discharge port 16 and the discharge passage 13 from the mixing area 20 as well. Consequently, the air is blown out from the front-side foot outlet (F-FOOT) and the rear-side foot outlet (R-FOOT) as well.

Note that the arrangement of the advanced position 11A is also effective in the foot mode, in which the air is blown out from the foot outlet only. This is because the air flows to the foot outlets (F-FOOT, R-FOOT) by a roundabout way after hitting the partition wall 11b.

[While the Door is Located in the Retreated Position]

On the other hand, the retreated position 11B (FIGS. 3 and 4) of the foot door 11 is set as a position that blocks (shuts off) no air by the partition wall 11b, and also as a position that reduces the flow resistance of the partition wall 11b against the air flowing from the merging area J to the downstream side (to the side of the discharge passage 12 in the case of Embodiment 1), as compared with the case of the advanced position 11A. In other words, the flow resistance of the partition wall 11b is smaller while the foot door 11 is located in the retreated position 11B than while the foot door 11 is located in the advanced position 11A.

In addition, in Embodiment 1, while the foot door 11 is located in the retreated position 11B, the discharge passage 13 and the discharge port 16 are designed to be closed by the partition wall 11b, the sidewalls 11c and the flange frame 11d. Specifically, the surface 18a of the seal member 18 (FIG. 5) abuts onto the inner flange part 2b protruding from the inner surface 2a of the case 2, and thus seals this portion. Simultaneously, on the other end side in the circumferential direction of the stems 11a, the surface 17a of the seal member 17 (FIG. 5) abuts on the inner wall 2a of the case 2, and thus seals this portion. The discharge passage 13 and the discharge port 16 are designed to be completely separated from the upstream side (the cold air passage 8 and the hot air passage 9) by the two seals. Consequently, the air conditioner for an automobile according to Embodiment 1 is capable of decreasing the number of parts, thus making the configuration of the apparatus smaller, and accordingly cutting back on manufacturing costs in comparison with the case where additional doors are provided so as to close the discharge passage 13 and the discharge port 16.

Note that, in Embodiment 1, the distance from the stems 11a to the end portion of the partition wall 11b in the circumferential direction (to the end edge of the flange frame 11d in the circumferential direction) on the rear side in the advancement direction of the foot door 11 (in the lower side in FIGS. 1 to 4) is set shorter than the distance from the stems 11a to the end portion of the partition wall 11b in the circumferential direction (to the end edge of the flange frame 11d in the circumferential direction) on the front side in the advancement direction of the foot door 11 (in the upper side in FIGS. 1 to 4). Thereby, while the foot door is located in the advanced position 11A, Embodiment 1 is capable of securely obtaining an interval between the partition wall 11b forming the detour passage (20→42) and the inner flange part 2b. In the case of Embodiment 1, the distance (diameter) of the partition wall 11b from the stems 11a is progressively changed in the circumferential direction. However, this configuration is not essential.

Here, while the foot door 11 is located in the retreated position 11B as shown in FIGS. 3 and 4, the mixing area 20 designed to be formed by the partition wall 11b of the foot door 11 in the advanced position 11A disappears. In Embodiment 1, however, while the foot door 11 is located in the retreated position 11B, no consideration need be given to the difference in temperature among the outlets communicating with the multiple discharge passages 12, 13 (and the discharge port 16) (for example, between VENT and FOOT), and no problem arises, when the air is selectively caused to flow to one of the multiple discharge passages 12, 13 (and the discharge port 16) (to the discharge passage 12 in Embodiment 1), instead of being caused to flow to the multiple discharge passages 12, 13 (and the discharge port 16).

In addition, even when multiple outlets (DEF, VENT) are connected to the selected discharge passage system (the discharge passage 12 in Embodiment 1), Embodiment 1 is capable of reducing the difference in temperature between the outlets (DEF, VENT) if the distance from the merging area J to the branch point between those outlets (DEF, VENT) can be appropriately secured, because the air is mixed in the distance between them.

While a vent mode shown in FIG. 3 is selected, the vent door 14 is located in the position 14A that closes the defroster outlet (DEF). For this reason, the air is blown out from the vent outlet (VENT) only. On the other hand, while a defrost mode shown in FIG. 4 is selected, the vent door 14 is located in the position 14B that closes the vent outlet (VENT), and concurrently the defrost door 15 is in the opened condition 15A. For this reason, the air is blown out from the defrost outlet (DEF) only.

Next, descriptions will be provided for effects which the air conditioner for an automobile brings about.

Effects listed below can be obtained from the air conditioner for an automobile according to Embodiment 1.

(1) The air conditioner for an automobile is configured such that: the air passage including the cold air passage 8 extending via the evaporator 6, the hot air passage 9 extending via the heater core 10, and the multiple discharge passage systems 12, 13, 16 communicating with the respective outlets is formed inside the case 2; and the air flows to the discharge passage systems 12, 13, 16 via the merging area J into which the cold air passage 8 and the hot air passage 9 merge. The air conditioner for an automobile includes the foot door 11 which has the partition wall 11b, and which is movable at least between the advanced position 11A and the retreated position 11B. The advanced position 11A is that to which the partition wall 11b advances to an extent that the partition wall 11b blocks the air flow from the merging area J to the downstream side in the air passage, and the retreated position 11B is that to which the partition wall 11b retreats from the advanced position 11A. While the foot door 11 is located in the advanced position 11A, the mixing area 20 is formed in the air passage by the partition wall 11b blocking the air flow from the merging area J to the downstream side. The mixing area 20 facilitates the mixture of the air flowing into the merging area J from the cold air passage 8 and from the hot air passage 9. Thus, the air is designed to flow to the discharge passage systems 12, 13, 16 via the mixing area 20. Accordingly, it is possible to form the mixing area 20 by causing the partition wall 11b to advance to the downstream side of the merging area J in the air passage, and thus to facilitate the mixture of the cold air from the cold air passage 8 and the hot air from the hot air passage 9 in the mixing area 20. Consequently, it is possible to reduce the difference in temperature of the air blown out from the respective outlets (DEF, VENT, F-FOOT, R-FOOT).

(2) While the foot door 11 is located in the retreated position 11B, the foot door 11 is designed to close at least one discharge passage 13. For this reason, the foot door 11 can close at least one discharge passage 13 (and the discharge port 16). Thus, it is possible to reduce the number of parts and thus to simplify the configuration, as compared with the case where additional doors are provided so as to open and close the discharge passage 13 (and the discharge port 16).

(3) The air conditioner for an automobile is configured such that: the air passage including the cold air passage 8 extending via the evaporator 6, the hot air passage 9 extending via the heater core 10, and the multiple discharge passage systems 12, 13, 16 communicating with the respective outlets is formed inside the case 2; and the air flows to the discharge passage systems 12, 13, 16 via the merging area J into which the cold air passage 8 and the hot air passage 9 merge. The air conditioner for an automobile includes the foot door 11 which has the partition wall 11b, and which is movable at least between the advanced position 11A and the retreated position 11B. The advanced position 11A is that to which the partition wall 11b advances to an extent that the partition wall 11b blocks the air flow from the merging area J to the downstream side in the air passage, and the retreated position 11B is that to which the partition wall 11b retreats from the advanced position 11A. While the foot door 11 is located in the advanced position 11A, the detour passages (20→42, 20→43, 20→46) in each of which the air flows from the merging area J toward the downstream side along the partition wall 11b in a roundabout way are formed in the air passage. Thus, the air is designed to flow to the discharge passage systems 12, 13, 16 via the respective detour passages (20→42, 20→43, 20→16). Accordingly, it is possible to form the detour passages (20→42, 20→43, 20→46) in each of which the air flows along the partition wall 11b in a roundabout way by causing the partition wall 11b to advance toward the downstream side of the merging area J in the air passage, and thus to facilitate the mixture of the cold air from the cold air passage 8 and the hot air from the hot air passage 9 while the air flows downstream in each of the bypass passages (20→12, 20→13, 20→16). Consequently, it is possible to reduce the difference in temperature of the air blown out from the respective outlets (DEF, VENT, F-FOOT, R-FOOT).

(4) The foot door 11 includes: the pair of substantially sector-shaped sidewalls 11c, 11c which are in parallel with each other; the partition 11b wall which connects the outer circumferential edges of the respective pair of sidewalls 11c, 11c together; and the stems 11a provided in locations acting as hinges of the substantially sector-shaped sidewalls 11c, respectively. Thus, the foot door 11 is formed as a rotary door of rotary type which is rotatably pivotally supported by the case 2, and which rotates about the stems 11a. The distance from the stems 11a to the end portion of the partition wall 11b in the circumferential direction on the rear side in the advancement direction of the foot door 11 is set shorter than the distance from the stems 11a to the end portion of the partition wall 11b in the circumferential direction on the front side in the advancement direction of the foot door 11. Thereby, while the foot door is located in the advanced position 11A, it is possible to secure an interval between the partition wall 11b forming the bypass passage (20→42) and the inner flange part 2b.

Embodiment 2

Descriptions will be provided hereinbelow for Embodiment 2 of the air conditioner for an automobile according to the present invention.

Embodiment 2 is an example of the air conditioner for an automobile which is so configured as to include two air mixing doors, and to adopt a rotary door having a rotational angle for the foot door for forming the mixing area and the detour passages.

First of all, descriptions will be provided for the configuration.

Figure 6:
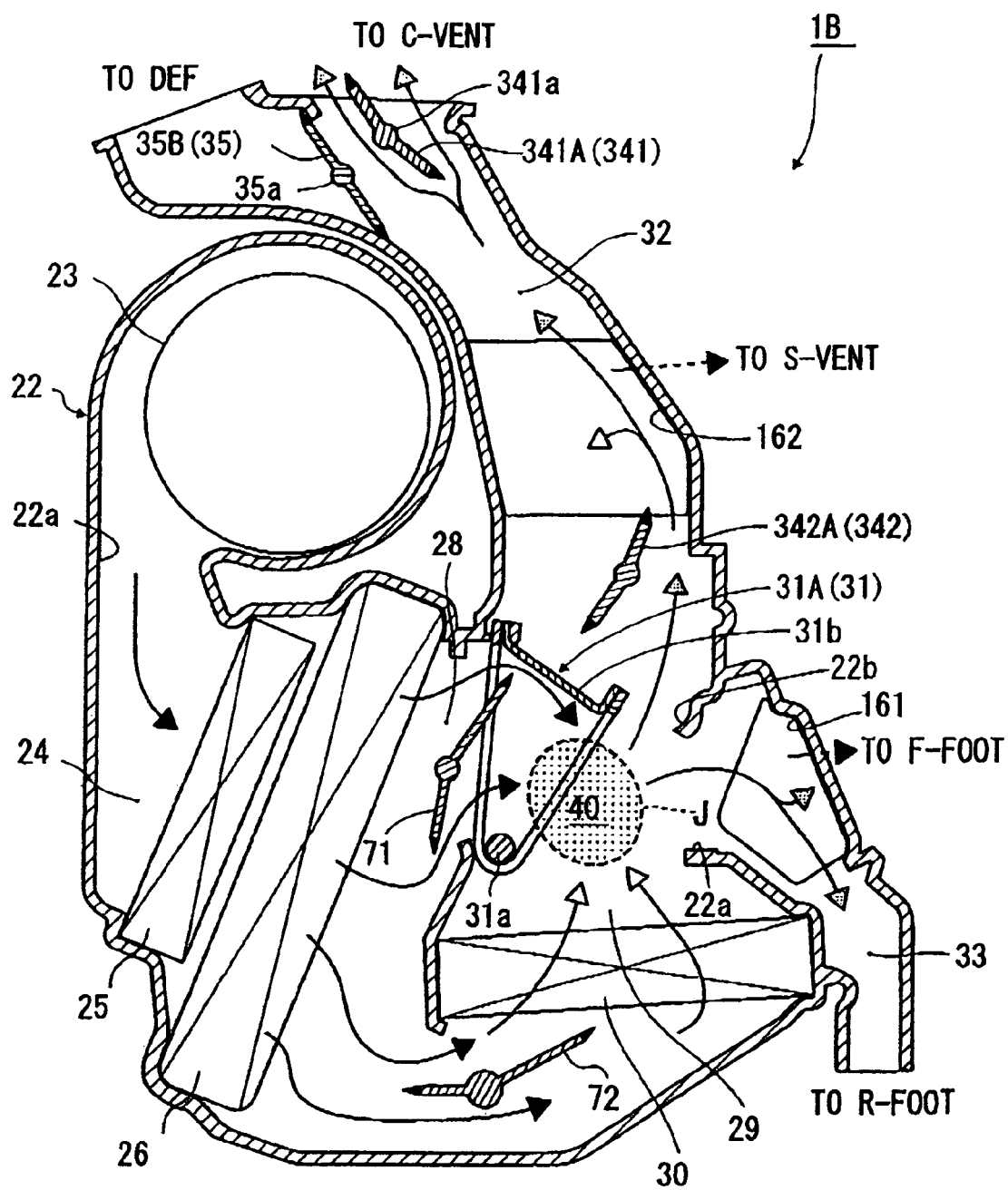
FIG. 6 is a vertical cross-sectional side view showing a bi-level mode for blowing the air from both a vent outlet and a foot outlet in an air conditioner for an automobile according to Embodiment 2.
Figure 7:
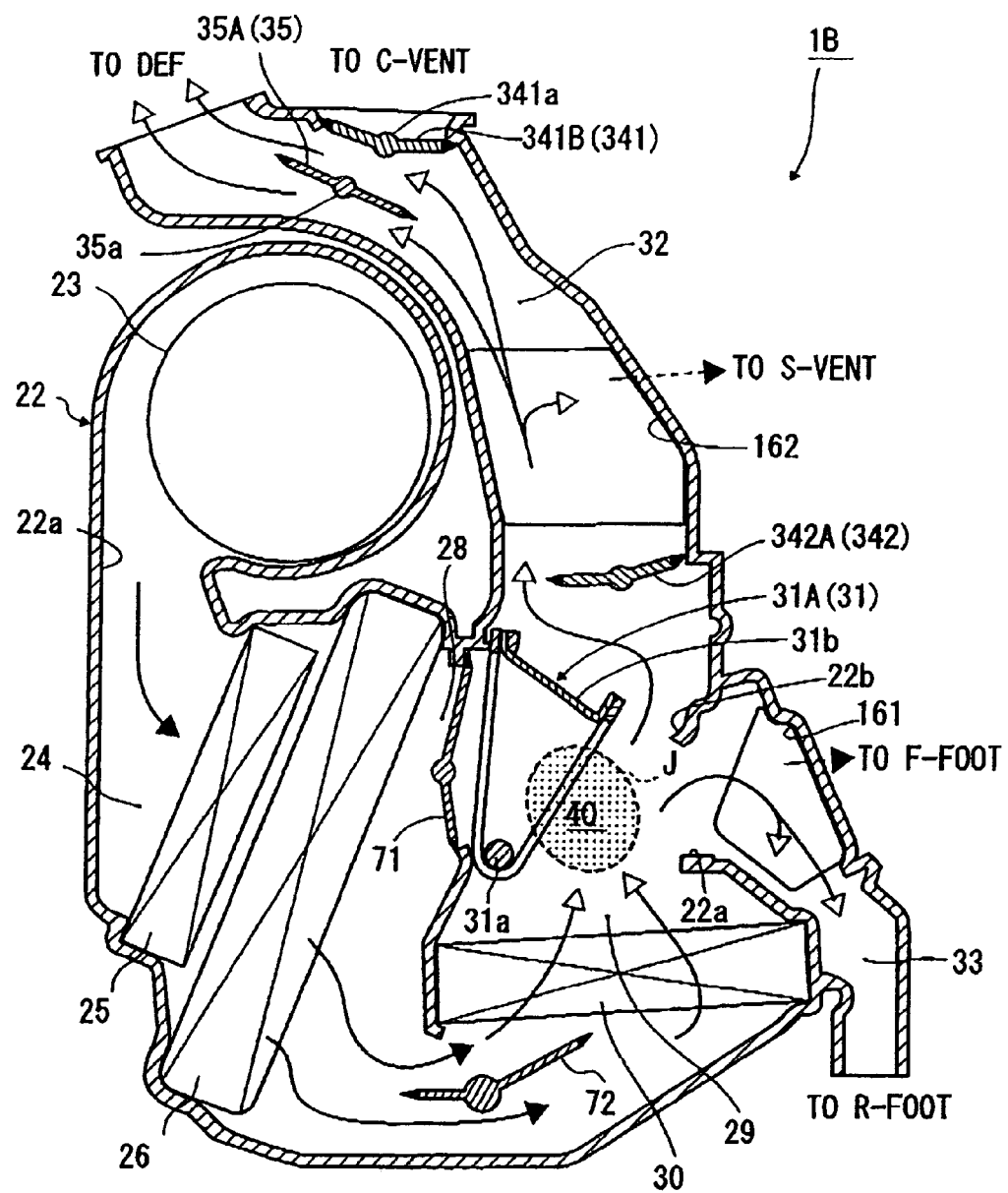
FIG. 7 is a vertical cross-sectional side view showing a defrost-foot mode for blowing the air from both a defroster outlet and the foot outlet in the air conditioner for an automobile according to Embodiment 2.
Figure 8:
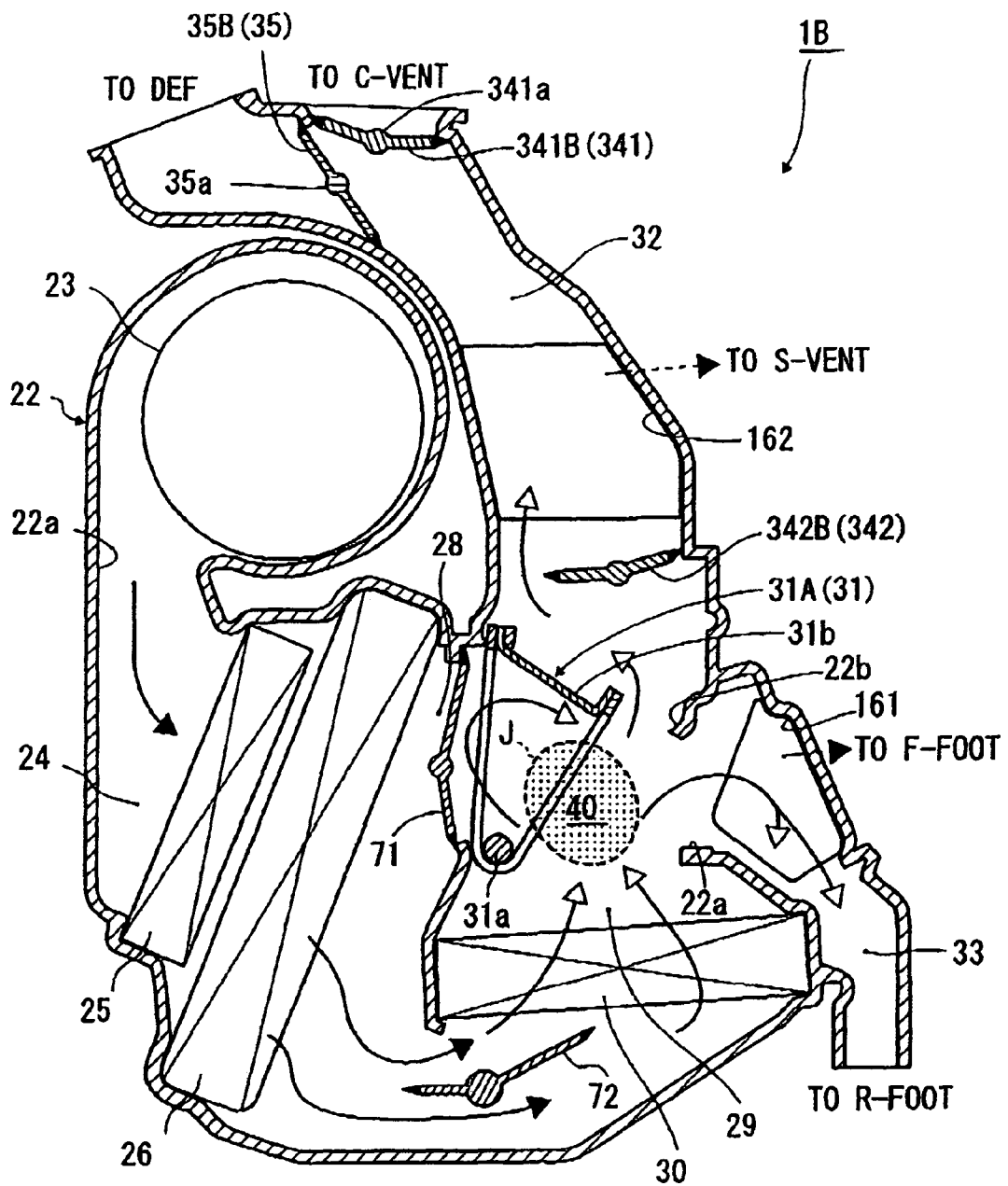
FIG. 8 is a vertical cross-sectional side view showing a foot mode for blowing the air from both a side vent outlet and the foot outlet in the air conditioner for an automobile according to Embodiment 2.
Figure 9:
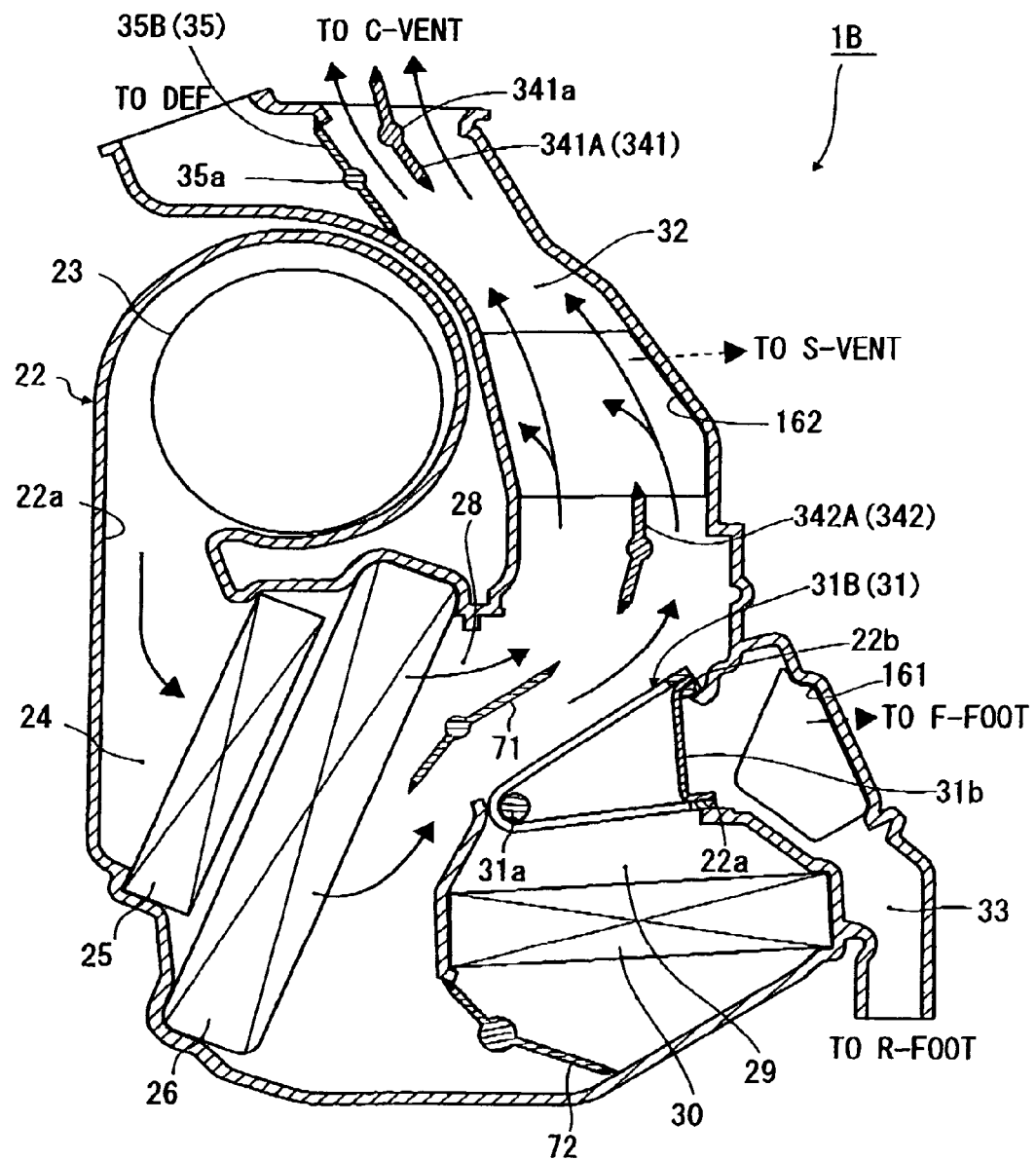
FIG. 9 is a vertical cross-sectional side view showing a vent mode for blowing the air from only the vent outlet in the air conditioner for an automobile according to Embodiment 2.
Figure 10:
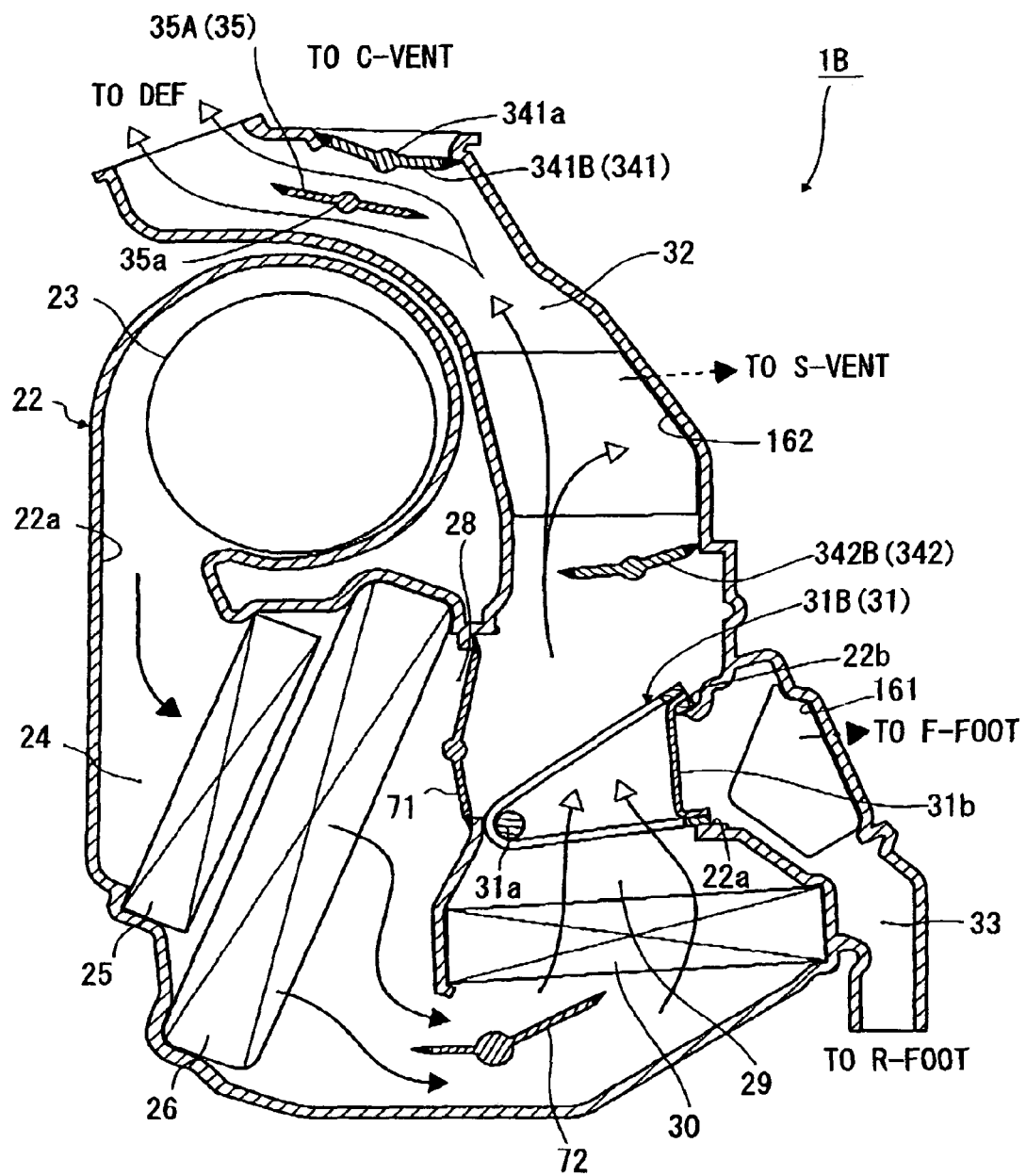
FIG. 10 is a vertical cross-sectional side view showing a defrost mode for blowing the air from only the defroster outlet in the air conditioner for an automobile according to Embodiment 2.

FIG. 6 is a vertical cross-sectional side view showing a bi-level mode for blowing the air from both a vent outlet and a foot outlet in an air conditioner for an automobile according to Embodiment 2. FIG. 7 is a vertical cross-sectional side view showing a defrost-foot mode for blowing the air from both a defroster outlet and the foot outlet in the air conditioner for an automobile according to Embodiment 2. FIG. 8 is a vertical cross-sectional side view showing a foot mode for blowing the air from both a side vent outlet and the foot outlet in the air conditioner for an automobile according to Embodiment 2. FIG. 9 is a vertical cross-sectional side view showing a vent mode for blowing the air from only the vent outlet in the air conditioner for an automobile according to Embodiment 2. FIG. 10 is a vertical cross-sectional side view showing a defrost mode for blowing the air from only the defroster outlet in the air conditioner for an automobile according to Embodiment 2.

Figure 11:
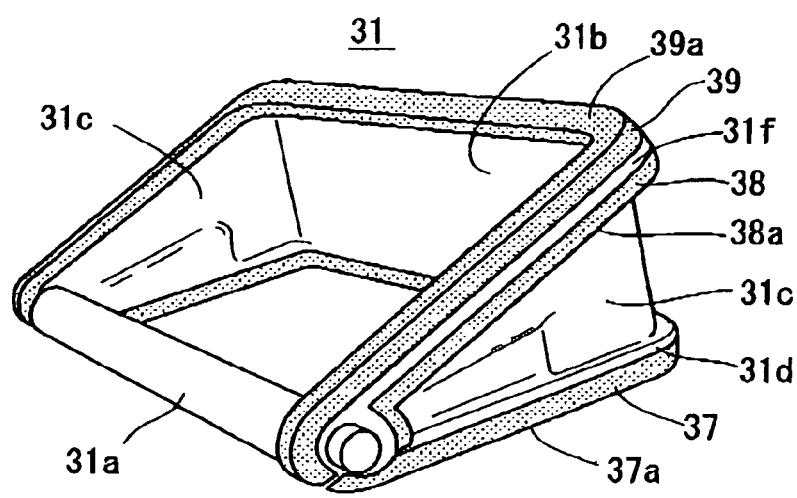
FIG. 11 is a perspective view showing the foot door in the air conditioner for an automobile according to Embodiment 2.
Figure 12:
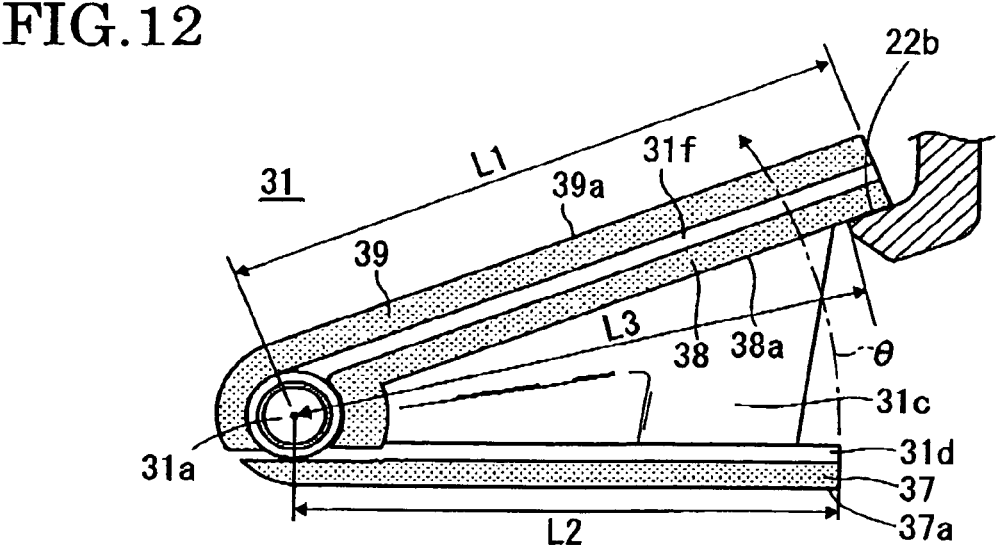
FIG. 12 is a side view showing the foot door in the air conditioner for an automobile according to Embodiment 2.
Figure 13:
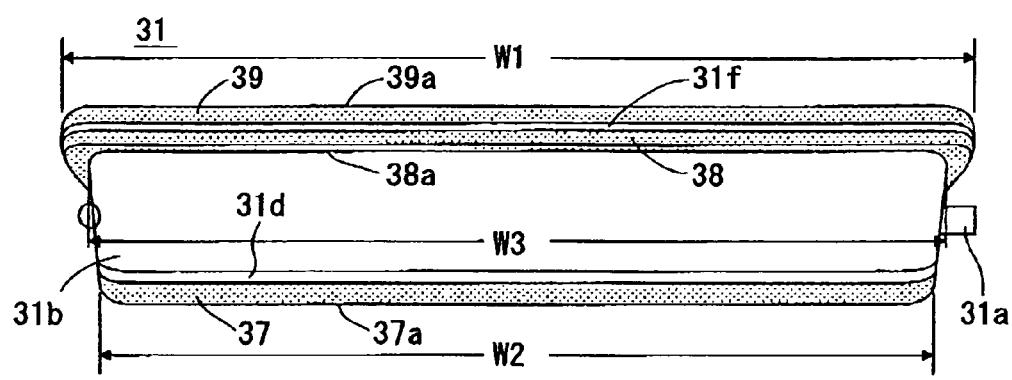
FIG. 13 is a front view showing the foot door in the air conditioner for an automobile according to Embodiment 2.

FIG. 11 is a perspective view showing the foot door in the air conditioner for an automobile according to Embodiment 2. FIG. 12 is a side view showing the foot door in the air conditioner for an automobile according to Embodiment 2. FIG. 13 is a front view showing the foot door in the air conditioner for an automobile according to Embodiment 2.

In an air conditioner 1B for an automobile according to Embodiment 2, an air passage is formed by appropriately defining the inside of a case 22 made of a synthetic resin or the like by using an inner wall 22a and the like. Conditions including a purification level and a temperature of the air are controlled by: air blowing parts (a blower 23, an introduction passage 24) provided in their respective upstream locations of the air passage; functional parts (a filter 25, an evaporator 26, a heater core 30 and the like) provided in the middle of the air passage; and a first air mixing door 71 and a second air mixing door 72. Air outlets (outlet modes) for this controlled air are changeable by an opened or closed position of each of a center vent door 341, a side vent door 342, a defrost door 35 and a foot door 31.

The air discharged from the blower 23 is purified while passing the filter 25 provided in the introduction passage 24.

In addition, the evaporator 26 constituting a part of a refrigeration cycle is provided posterior to (downstream of) the filter 25, so that the air can be cooled. A hot air passage 29 with the heater core 30 and a cold air passage 28 without the heater core 30 are provided in parallel posterior to the evaporator 26.

A ratio of distribution of the air between the cold air passage 28 and the hot air passage 29 can be set variable by positions where the first air mixing door 71 and the second air mixing door 72 both provided posterior to the evaporator 26 are located, respectively. Specifically, in the case of Embodiment 2, while the first air mixing door 71 is located in its closed position and the second air mixing door 72 is located in its opened position as shown in FIG. 7, the air does not flow into the cold air passage 28, but flows in the hot air passage 29 only. In contrast, while the first air mixing door 71 is located in its opened location and the second air mixing door 72 is in its closed position as shown in FIG. 9, the air does not flow into the hot air passage 29, but flows in the cold air passage 28 only.

While the first air mixing door 71 is located in a middle position as shown in FIG. 6, the air having passed the hot air passage 29 and the air having passed the cold air passage 28 are designed to become confluent, and thus the mixture of the cold air and the hot air is designed to be facilitated in a mixing area 40 coinciding with the merging area J. After the cold air and the hot air are mixed together in this mixing area 40, the mixed air is distributed among discharge passages 32, 33 and discharge port 161, 162, as well as is thus blown out from the corresponding outlets (a defroster outlet (DEF), a vent outlet (C-VENT[center], S-VENT[side]), and foot outlets (F-FOOT[front], R-FOOT[rear]). The distribution of the air among the discharge passages 32, 33 and the discharge port 161, 162 as well as the selection of the outlets is controlled by the vent doors 341, 342, the defrost door 35 and the foot door 31. This control will be described later.

Here, in Embodiment 2, provided is the foot door 31 (door) movable between an advanced position 31A (shown in FIGS. 6, 7 and 8) that blocks the downstream side of the merging area J and a retreated position 31B (shown in FIGS. 9 and 10) to which the foot door 31 retreats from the advanced position 31A. In the case of Embodiment 2, this foot door 31 is configured as a rotary door of rotary type which is pivotally supported by the case 22 so as to be rotatable, and which rotates about stems 11a.

Specifically, as shown in FIG. 11, the foot door 31 includes: a pair of substantially sector-shaped sidewalls 31c, 31c which are in parallel with each other; a partition wall 31b which connects the outer circumferential edges of the respective pair of sidewalls 31c, 31c together; and the pair of stems 11a which jut out in mutually-opposite directions from locations acting as hinges of the substantially sector-shaped sidewalls 31c, respectively. In addition, substantially U-shaped flange frames 31d, 31f are formed in the side edges of the sidewalls 31c and the side edge of the partition wall 31b. A seal member 37 is adhered to the flange frame 31d, and seal members 38, 39 are adhered to the flange frames 31f. When the foot door 31 is in the retreated position 31B, surfaces 37a, 38a of the seal members 37, 38 abut on the inner wall 22a and an inner flange part 22b of the case 22, respectively. Thereby, the abutting parts are designed to be securely sealed (see FIGS. 9 and 10). In the advanced position 31A, surface 39a of this seal member 39 abuts on the inner wall 22a of the case 22. Thereby, the abutting part is designed to be securely sealed (see FIGS. 6, 7 and 8).

Next, descriptions will be provided for how the air conditioner for an automobile operates.

[While the Foot Door is Located in the Advanced Position]

In the air conditioner 1B for an automobile according to Embodiment 2, the partition wall 31b blocks (shuts off) the air flow from the merging area J to the downstream side, while the foot door 31 is located in the advanced position 31A as shown in FIG. 6. This block (shutoff) of the air forms the mixing area 40 for facilitating the mixture of the air flowing into the merging area J from the cold air passage 28 and the air flowing from the hot air passage 29.

Specifically, the flow rate of the air becomes smaller, and the direction of the air flow changes to a larger extent, while the foot door 31 is located in the advanced position 31A than while the foot door 31 is not located in the advanced position 31A (or while the foot door 31 is located in the retreated position 31B). The smaller flow rate of the air and the larger change in the air flow direction cause air flow separation, whirl, turbulence and the like. In addition, the paths to the respective outlets become longer in length while the foot door 31 is located in the advanced position 31A. This facilitates the mixture of the cold air flowing into the merging area J from the cold air passage 28 and the hot air flowing into the merging area J from the hot air passage 29. It can be said that, when the partition wall 31b advances to the advanced position 31A in this manner, detour passages (40→32, 40→33, 40→161, 40→162) in each of which the air flows along the partition wall 31b in a roundabout way are formed for the downstream side (including the discharge passages 32, 33 and the discharge ports 161, 162) of the merging area J.

Moreover, in Embodiment 2, the cold air passage 28 is arranged relatively close to the defroster outlet (DEF) or the vent outlets (C-VENT, S-VENT). With this arrangement, if the advanced position 31A is established in a way that the partition wall 31b is located between the cold air passage 28 and the defroster outlet (DEF), or between the cold air passage 28 and the vent outlets (C-VENT, S-VENT), it is possible to effectively reduce the amount of cold air flowing directly into the defroster outlet (DEF) or the vent outlets (C-VENT, S-VENT) from the cold air passage 28 without being mixed with the hot air from the hot air passage 29. Consequently, Embodiment 2 is capable of effectively checking the difference in temperature from becoming larger between the defroster outlet (DEF) or the vent outlets (C-VENT, S-VENT) and the foot outlets (F-FOOT, R-FOOT).

Embodiment 2 brings about this effect by causing an end edge (or the surface 39a of the seal member 39) of the partition wall 31b of the foot door 31 in the moving direction to abut onto the inner wall 22a of the case 22 as shown in FIG. 9, and accordingly blocking the air flow from the mixing area 40 to the downstream side along the inner wall 22a by bypassing. In other words, it is easily understood that Embodiment 2 brings about the highest effect by blocking the air from flowing along the inner wall 22a closer to the defroster outlet (DEF) or the vent outlets (C-VENT, S-VENT), and thus by causing the air to flow to the discharge passage 33 far from the defroster outlet (DEF) or the vent outlets (C-VENT, S-VENT) in a roundabout way.

While a bi-level mode shown in FIG. 6 is selected, the center vent door 34 supported by the case 22 so as to be rotatable about its stems 341 is located in a position 341A that opens the center vent outlet (C-VENT), and the side vent door 342 is located in a position 342A that opens the side vent outlet (S-VENT). For this reason, the air having flowed out to the discharge passage 32 (i.e. a first discharge passage) from the mixing area 40 through (by passing in a roundabout way) the outside of the end edge of the partition wall 31b in the moving direction is blown out from the side vent outlet (S-VENT) and the center vent outlet (C-VENT). Simultaneously, the air flows out to the discharge port 161 and the discharge passage 33 (i.e. a second discharge passage) from the mixing area 40 as well. Consequently, the air is blown out from the front-side foot outlet (F-FOOT) and the rear-side foot outlet (R-FOOT) as well.

On the other hand, while the defrost-foot mode shown in FIG. 7 is selected, the center vent door 341 is located in a position 341B that closes the center vent outlet (C-VENT), and concurrently the defrost door 35 supported by the case 22 so as to be rotatable about its stems 35a is in an opened condition 35A. For this reason, the air having flowed out to the discharge passage 32 from the mixing area 40 through (by passing in a roundabout way) the outside of the end edge of the partition wall 31b in the moving direction is blown out from the defrost outlet (DEF). Simultaneously, the air flows out to the discharge port 161 and the discharge passage 33 from the mixing area 40 as well. Consequently, the air is blown out from the front-side foot outlet (F-FOOT) and the rear-side foot outlet (R-FOOT) as well. Note that part of the air having flowed out to the discharge passage 32 is blown out from the side vent outlet (S-VENT) as well.

While a foot mode shown in FIG. 8 is selected, the center vent door 341 is located in the position 341B that closes the center vent outlet (C-VENT), and concurrently the defrost door 35 supported by the case 22 so as to be rotatable about the stems 35a is in a closed condition 35B. For this reason, the air flows out to the discharge port 161 and the discharge passage 33 from the mixing area 40 as well. Thus, the air is blown out from the front-side foot outlet (F-FOOT) and the rear-side foot outlet (R-FOOT). Note that part of the air having flowed out from the mixing area 40 to the discharge passage 32 through (by passing in a roundabout way) the outside of the end edge of the partition wall 31b in the moving direction is blown out from the side vent outlet (S-VENT) as well.

[While the Door is Located in the Retreated Position]

On the other hand, the retreated position 31B (FIGS. 9 and 10) of the foot door 31 is set as a position that blocks (shuts off) no air by the partition wall 31b, and also as a position that reduces the flow resistance of the partition wall 31b against the air flowing from the merging area J to the downstream side (to the side of the discharge passage 32 in the case of Embodiment 2), as compared with the case of the advanced position 31A. In other words, the flow resistance of the partition wall 31b is smaller while the foot door 31 is located in the retreated position 31B than while the foot door 31 is located in the advanced position 31A.

In addition, in the case of Embodiment 2, while the foot door 31 is located in the retreated position 31B, the discharge passage 33 and the discharge port 161 are designed to be closed by the partition wall 31b, the sidewalls 31c and the flange frames 31d, 31f. Specifically, the surface 38a of the seal member 38 (FIG. 11) abuts onto the inner flange part 22b protruding from the inner surface 22a of the case 22, and thus seals this portion. Simultaneously, on the other end side in the circumferential direction of the stems 11a, the surface 37a of the seal member 37 (FIG. 11) abuts on the inner wall 22a of the case 22, and thus seals this portion. The discharge passage 33 and the discharge port 161 are designed to be completely separated from the upstream side (the cold air passage 28 and the hot air passage 29) by the two seals. Consequently, the air conditioner for an automobile according to Embodiment 2 is capable of decreasing the number of parts, thus making the configuration of the apparatus smaller, and accordingly cutting back on manufacturing costs in comparison with the case where additional doors are provided so as to close the discharge passage 33 and the discharge port 161.

In Embodiment 2, as shown in FIG. 12, a seal surface distance L2 from the stems 31a to the end portion of the partition wall 31b in the circumferential direction (to the end edge of the flange frame 31d in the circumferential direction) on the rear side in the advancement direction of the foot door 31 (in the lower side in FIGS. 9 and 10) is set shorter than a seal surface distance L2 from the stems 31a to the end portion of the partition wall 31b in the circumferential direction (to the end edge of the flange frame 31f in the circumferential direction) on the front side in the advancement direction of the foot door 31 (in the upper side in FIGS. 9 to 10). In sum, the seal surface distances L1, L2 are set to satisfy L1>L3>L2, where L3 denotes a seal surface distance from the stems 31a to the inner flange part 22b. Furthermore, in Embodiment 2, as shown in FIG. 13, a seal surface breadth W2 of the end portion of the foot door 31 in the circumferential direction on the rear side of the advancement direction of the foot door 31 is set shorter than a seal surface breadth W1 of the end portion of the foot door 31 in the circumferential direction on the front side of the advancement direction of the foot door 31. In sum, the seal surface breadths W1, W2 are set to satisfy W1>W3>W2, where W3 denotes a maximum breadth of the partition wall 31b. Consequently, in comparison with the retreated position 31B, the advanced position 31A can be set to have a rotational angle θ of the foot door 31 that exceeds the inner flange part 22b, as shown in FIG. 12. Thus, when the foot door 31 is positioned in the advanced position 31A, a sufficient interval can be secured between the inner flange 22b and the partition wall 31b forming the detour passage (40→32).

In this respect, while the foot door 31 is located in the retreated position 31B as shown in FIGS. 9 and 10, the mixing area 40 designed to be formed by the partition wall 31b of the foot door 31 in the advanced position 31A disappears. In Embodiment 2, however, while the foot door 31 is located in the retreated position 31B, no consideration need be given to the difference in temperature among the outlets communicating with the multiple discharge passages 32, 33 (and the discharge ports 161, 162) (for example, between VENTs and FOOTs), and no problem arises, when the air is selectively caused to flow to one of the multiple discharge passages 32, 33 (and the discharge ports 161, 162) (to the discharge passage 32 and the discharge port 162 in Embodiment 2), instead of being caused to flow to the multiple discharge passages 32, 33 (and the discharge ports 161, 162) simultaneously.

In addition, even when multiple outlets (DEF, C-VENT, S-VENT) are connected to the selected discharge passage system (the discharge passage 12 in Embodiment 2), Embodiment 2 is capable of reducing the difference in temperature among the outlets (DEF, C-VENT, S-VENT) if the distance from the merging area J to the branch point among those outlets (DEF, C-VENT, S-VENT) can be appropriately secured, because the air is mixed within the distance.

While a vent mode shown in FIG. 9 is selected, the center vent door 341 and the side vent door 342 are located in the positions 341A, 342A that open the center vent outlet (C-VENT) and the side vent outlet (S-VENT), respectively. For this reason, the air is blown out from the center vent outlet (C-VENT) and the side vent outlet (S-VENT) only.

On the other hand, while a defrost mode shown in FIG. 10 is selected, the center vent door 341 and the side vent door 342 are located in the positions 341B, 342B that close the center vent outlet (C-VENT) and the side vent outlet (S-VENT), respectively. Concurrently, the defrost door 35 is in the opened condition 35A. For this reason, the air is blown out from the defrost outlet (DEF) only. Note that part of the air is blown out from the side vent outlet (S-VENT).

Next, descriptions will be provided for effects which the air conditioner 1B for an automobile according to Embodiment 2 brings about.

In addition to the effects of (1) to (3) in Embodiment 1, the following effect can be obtained from the air conditioner 1B for an automobile according to Embodiment 2.

(4) The foot door 31 includes: the pair of substantially sector-shaped sidewalls 31c, 31c which are in parallel with each other; the partition wall 31b which connects the outer circumferential edges of the respective pair of sidewalls 31c, 31c together; and the stems 31a provided in the locations acting as hinges of the substantially sector-shaped sidewalls 31c, 31c, respectively. Thus, the foot door 31 is formed as a rotary door of rotary type which is rotatably pivotally supported by the case 22, and which rotates about the stems 31a. The seal surface distance L2 from the stems 31a to the end portion in the circumferential direction on the rear side in the advancement direction of the foot door 31 is set shorter than the seal surface distance L1 from the stems 31a to the end portion in the circumferential direction on the front side in the advancement direction of the foot door 31. The seal surface breadth W2 of the end portion in the circumferential direction on the rear side of the advancement direction of the foot door 31 is set shorter than the seal surface breadth W1 of the end portion in the circumferential direction on the front side of the advancement direction of the foot door 31. For these reason, while securing the sealing performance, it is possible to form a large angle as the rotational angle θ of the foot door 31 between the retreated position 31B and the advanced position 31A. Consequently, it is possible to secure the sufficient interval between the inner flange part 22b and the partition wall 31b forming the detour passage (40→32), in the advanced position 31A.

The above descriptions have been provided for the air conditioner for an automobile according to the present invention on the basis of Embodiments 1 and 2. However, the specific configurations of the air conditioner for an automobile according to the present invention are not limited to these embodiments. Any design modification and any design addition are allowable as long as the design modification and the design addition do not depart from the gist of the present invention as recited in the claims in the scope of claims.

For example, the retreated position of the foot door may be set in a different location such as a location along a partition wall of the case which is closer to the evaporator. In addition, the form of the foot door may be modified variously. Although the case where the partition wall of the foot door is substantially shaped like an arc has been shown for Embodiment 1, and although the case where the partition wall of the foot door is substantially shaped like a flat plate has been shown for Embodiment 2, the specific cross-sectional form of the partition wall of the foot door is not limited to these shapes.

In Embodiments 1 and 2, an example of the foot door which closes the discharge passages in the retreated position, and which forms the mixing area (or the air mixture chamber) and the detour passages has been described. Instead, however, any door other than the foot door, for example, the side vent door or the like, may be used to form the mixing area and the detour passages. Otherwise, a specialized door may be used to form, in its advanced position, a mixing area and detour passages.

What is claimed is:

1. An air conditioner for an automobile, the air conditioner comprising:
a case having an air passage formed therein, the air passage including a cold air passage having an evaporator, a hot air passage having a heater core, a plurality of discharge passage systems communicating with outlets and including a first discharge passage and a second discharge passage, and a merging area in which the cold air passage and the hot air passage merge, wherein air flows into each of the outlets from the merging area;
a door disposed in the merging area and including a partition wall configured to be movable between an advanced position and a retreated position where the partition wall retreats from the advanced position; and
a mixing area formed by the partition wall of the door at an area where the cold air passage meets the hot air passage,
wherein the outlets include a vent outlet and a foot outlet provided downstream of the merging area,
wherein the door partially blocks air flowing from the merging area to the first discharge passage to mix cold air from the cold air passage and hot air from the hot air passage in the mixing area when the door is in the advanced position, and guides air from the mixing area to the first discharge passage along the partition wall through detour passages when the door is in the advanced position, the detour passages being configured to communicate with the vent outlet and the foot outlet,
wherein the door closes air flow to the second discharge passage and does not block air flow to the first discharge passage when the door is in the retreated position,
wherein the door includes a pair of substantially sector-shaped sidewalls which are parallel with each other and a stem acting as a hinge of the sidewalls, and each of the sector-shaped sidewalls has edges which extend in a radial direction from the stem,
wherein the partition wall is connected to outer circumferential edges of the sidewalls,
wherein the door is formed as a rotary door that rotates about the stem, and the door is rotatably and pivotally supported by the case,
wherein the door is configured such that a distance from the stem to an end portion of the partition wall in a circumferential direction on a rear side of the door is shorter than a distance from the stem to the end portion of the partition wall in the circumferential direction on a front side of the door, the front side of the door being in front of the rear side of the door in an advancement direction of the door,
wherein a rotational angle of the door between the advanced position and the retreated position is larger than a central angle between the edges of each of the sector-shaped sidewalls, and
wherein the case and the door are configured such that air is blown from both the vent outlet and the foot outlet through the detour passages when blowing the air from both the vent outlet and the foot outlet simultaneously.

2. The air conditioner of claim 1, wherein the outlets further include a defrost outlet.

3. The air conditioner of claim 1, wherein the vent outlet is a center vent outlet, and the outlets further include a defrost outlet and a side vent outlet,
wherein the first discharge passage communicates with the center vent outlet and the side vent outlet of the air conditioner, and
wherein a center vent door is disposed at the center vent outlet and is adjustable to close the center vent outlet, a defrost door is disposed at the defrost outlet and is adjustable to close the defrost outlet.

4. The air conditioner of claim 3, wherein a first air mixing door is disposed in the cold air passage,
wherein a second air mixing door is disposed in the hot air passage, and
wherein the first air mixing door and the second air mixing door are adjustable to control a distribution of air between the cold air passage and the hot air passage.

5. The air conditioner of claim 4, further comprising a blower communicated with the case for blowing air through the air passage,
wherein the evaporator is disposed downstream of the blower, the heater core is disposed downstream of the evaporator, and the door is disposed downstream of the evaporator and the heater core.

6. The air conditioner of claim 5, wherein the first air mixing door is disposed between the evaporator and the door, and the second air mixing door is disposed between the evaporator and the heater core.

7. The air conditioner of claim 4, wherein the first air mixing door is disposed between the evaporator and the door, and the second air mixing door is disposed between the evaporator and the heater core.

8. The air conditioner of claim 1, wherein the door includes:
a seal member provided on an end portion of the door in a circumferential direction on a rear side of the door and a first seal surface which contacts the case in the retreated position; and
a seal member provided on the end portion of the door in the circumferential direction on a front side of the door and a second seal surface which contacts the case in the advanced position,
wherein the door is configured such that a distance between the first seal surface and the stem is shorter than a distance between the second seal surface and the stem, and
wherein a breadth of the first seal surface is shorter than that of the second seal surface.

9. The air conditioner of claim 1, wherein the detour passages include a first detour passage which leads to the vent outlet and which is formed by a clearance between the partition wall and the case when the door is in the advanced position.

10. The air conditioner of claim 1, wherein the case and the door are configured such that air is blown from both the vent outlet and the foot outlet through the detour passages when the door is in the advanced position, and such that air cannot be blown from the foot outlet when the door is in the retreated position.

* * * * *